US007641383B2

(12) United States Patent
Sjogren et al.

(10) Patent No.: US 7,641,383 B2
(45) Date of Patent: Jan. 5, 2010

(54) THERMAL SWITCH CALIBRATION APPARATUS AND METHODS

(75) Inventors: Allen Erik Sjogren, Park City, UT (US); Eric Nerdrum, Kaysville, UT (US); Michael Harney, Pleasant Grove, UT (US)

(73) Assignee: Fluke Corporation, Everett, WA (US)

( * ) Notice: Subject to any disclaimer, the term of this patent is extended or adjusted under 35 U.S.C. 154(b) by 212 days.

(21) Appl. No.: 11/823,504

(22) Filed: Jun. 27, 2007

(65) Prior Publication Data

US 2009/0003406 A1 Jan. 1, 2009

(51) Int. Cl.
*G01N 25/72* (2006.01)

(52) U.S. Cl. .......................................... 374/5; 374/107

(58) Field of Classification Search ..................... 374/5, 374/107

See application file for complete search history.

(56) References Cited

U.S. PATENT DOCUMENTS 3,683,654 A 8/1972 Hire .............................. 72/30
3,883,720 A 5/1975 Snider ........................ 219/535
4,262,273 A 4/1981 Grable ........................ 337/67
4,901,257 A 2/1990 Chang et al. ........... 364/571.01
2006/0208846 A1 9/2006 Davis et al. ................. 337/333

FOREIGN PATENT DOCUMENTS

GB 1542198 8/1977

*Primary Examiner*—Andre J Allen
(74) *Attorney, Agent, or Firm*—Dorsey & Whitney LLP

(57) ABSTRACT

An apparatus and method for testing thermal switches is disclosed including modulating the temperature of a receiver in thermal contact with a thermal switch at a first rate within a range containing the nominal switch temperature of the thermal switch. A first temperature at which the switch changes state is recorded. The temperature is then modulated at a second rate and a second temperature at which the switch again changes state is recorded. The temperature may be modulated at a third rate slower than the second rate to determine a third temperature. The first, second, and third switch temperatures are then processed and output to an operator. The first, second, and third rates may be determined according to an exponentially decreasing function.

19 Claims, 3 Drawing Sheets

THERMAL SWITCH CALIBRATION APPARATUS AND METHODS

TECHNICAL FIELD

This invention relates generally to systems and methods for calibrating thermal switches.

BACKGROUND OF THE INVENTION

It is typical for thermometers and thermal switches to be calibrated using a drywell. Drywells may include a receiver in which a thermometer or thermal switch is inserted. A heating element and temperature sensor are in thermal contact with the receiver such that the temperature within the receiver may be accurately set. The set temperature of the drywell may then be compared to the readout temperature of the thermometer or the switching temperature of a thermal switch to determine its accuracy. In some uses, a reference thermometer is inserted within the receiver along with the thermometer or switch being calibrated, and the readout of the reference thermometer is used for calibration purposes.

In prior systems thermal switches were tested by inputting to the drywell controller upper and lower boundaries of a range that contained the nominal switch temperature. The drywell controller then swept the receiver temperature within that range in order to cause the switch to change state.

This method has a number of deficiencies. It requires a large amount of user interaction to determine and input the range. In some instances device specifications must be consulted or calculations made. Alternatively, the values used for the upper and lower boundaries of the range may be left to the guesswork of the operator. In some instances, the range input may potentially fail to contain the actual switching temperature of the switch or the upper or lower bounds of the switch's hysteresis range. The measured switching temperature may also be inaccurate due to variations in the rate at which the temperature is swept during testing, inasmuch as the thermal response time of the drywell and switch is not immediate.

In view of the foregoing it would be an advancement in the art to provide a convenient and accurate method for testing thermal switches using a drywell.

SUMMARY OF THE INVENTION

In one aspect of the invention a drywell executes a novel process for measuring a switching temperature of a thermal switch. The drywell may include a receiver adapted to receive a portion of a thermal switch having a nominal switch temperature, a heating element in thermal contact with the receiver, and a temperature sensor in thermal contact with the receiver. The drywell may further include a controller coupled to the heater, temperature sensor, and thermal switch.

In one aspect of the invention, a user inputs a nominal switch temperature into the controller. The controller is programmed to modulate the temperature of the receiver at a first rate within a range containing the nominal switch temperature. When a change in the state of the thermal switch is detected, the switch temperature at which the change in state occurred is recorded. The controller then causes the heater to modulate the temperature of the receiver at a second rate, slower than the first rate, until the thermal switch changes state a second time. The switch temperature at which the second change in state occurred is also recorded. In some embodiments, this process is repeated at a third rate slower than the first and second rate to determine a third switch temperature. The first, second, and third, switch temperatures are then processed and output to an operator.

In another aspect of the invention, the first, second, and third rate are determined according to an exponentially decreasing function. In some embodiments, the first, second, and third switch temperatures are weighted and averaged to determine an output. In some embodiments, the weights are determined according to an exponentially increasing function.

DETAILED DESCRIPTION OF PREFERRED EMBODIMENTS

Figure 1:
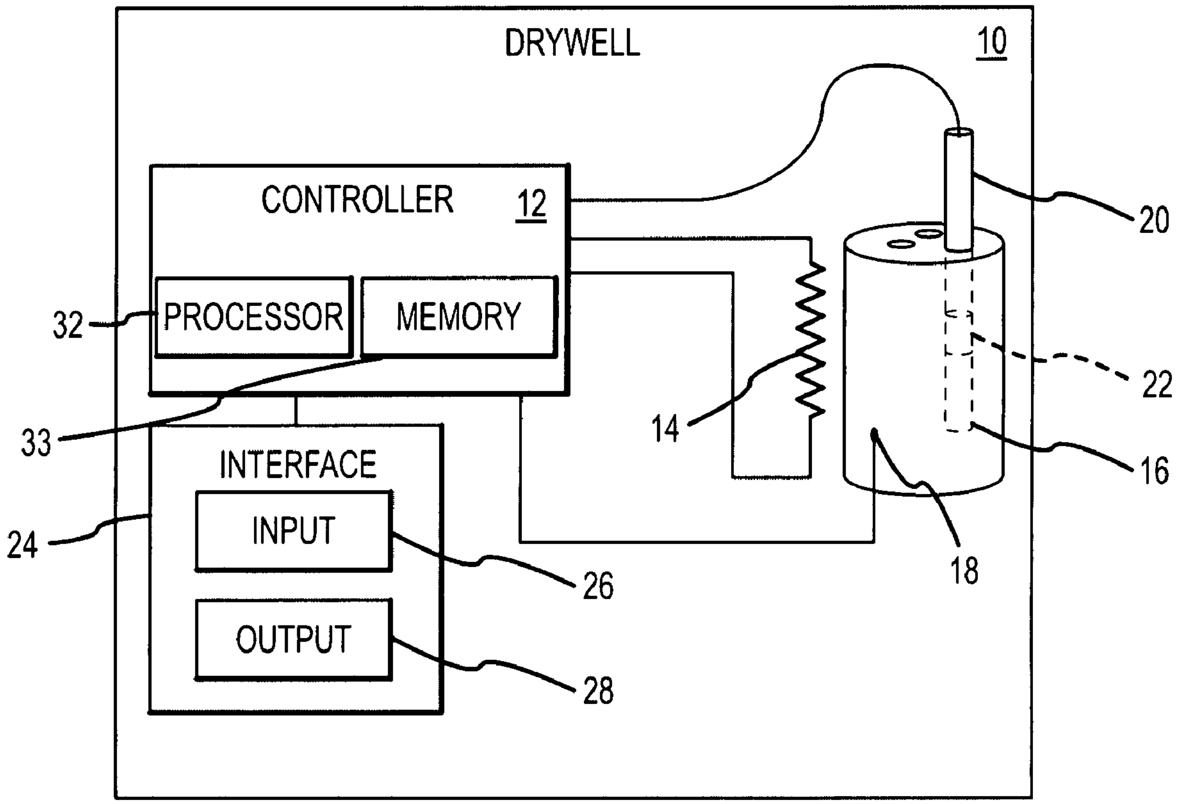
FIG. 1 is a schematic block diagram of a drywell in accordance with an embodiment of the present invention.

Referring to FIG. 1, in one embodiment of the invention, a drywell 10, or like device is used to determine the switching temperature of thermal switches. The drywell 10 may include a controller 12 coupled to a heating element 14. The heating element 14 may heat a receiver 16. A temperature sensor 18 may also be in thermal contact with the receiver 16 and transmit a signal corresponding to the temperature of the receiver to the controller 12 in order to provide feedback to the controller 12 to enable accurate control of the temperature of the receiver 16. The receiver 16 may be sized to receive a probe 20, or like structure, coupled to a thermal switch 22. The switch 22 may be positioned within the probe 20 such that the switch 22 is positioned within the receiver 16 during testing. Alternatively, the switch 22 may be electrically coupled to the probe 20 and located outside the receiver 16 during testing. The switch 22 may be coupled to the controller 12 such that the controller 12 detects when the switch 22 changes state responsive to a change in temperature.

An interface 24 coupled to the controller 12 may include an input device 26 such as a keypad, touch screen, or the like. The interface 24 may further include an output device 28 such as a numerical readout or screen. The controller 12 may further include a processor 32. The processor 32 controls operation of the drywell 10 in order to execute a testing algorithm according to embodiments of the invention. The processor 32 may be operably coupled to a memory 33 storing executable data instructing the processor to perform the testing algorithm. The memory 33 may also store operational data such as input data and the results of the testing algorithm.

Figure 2:
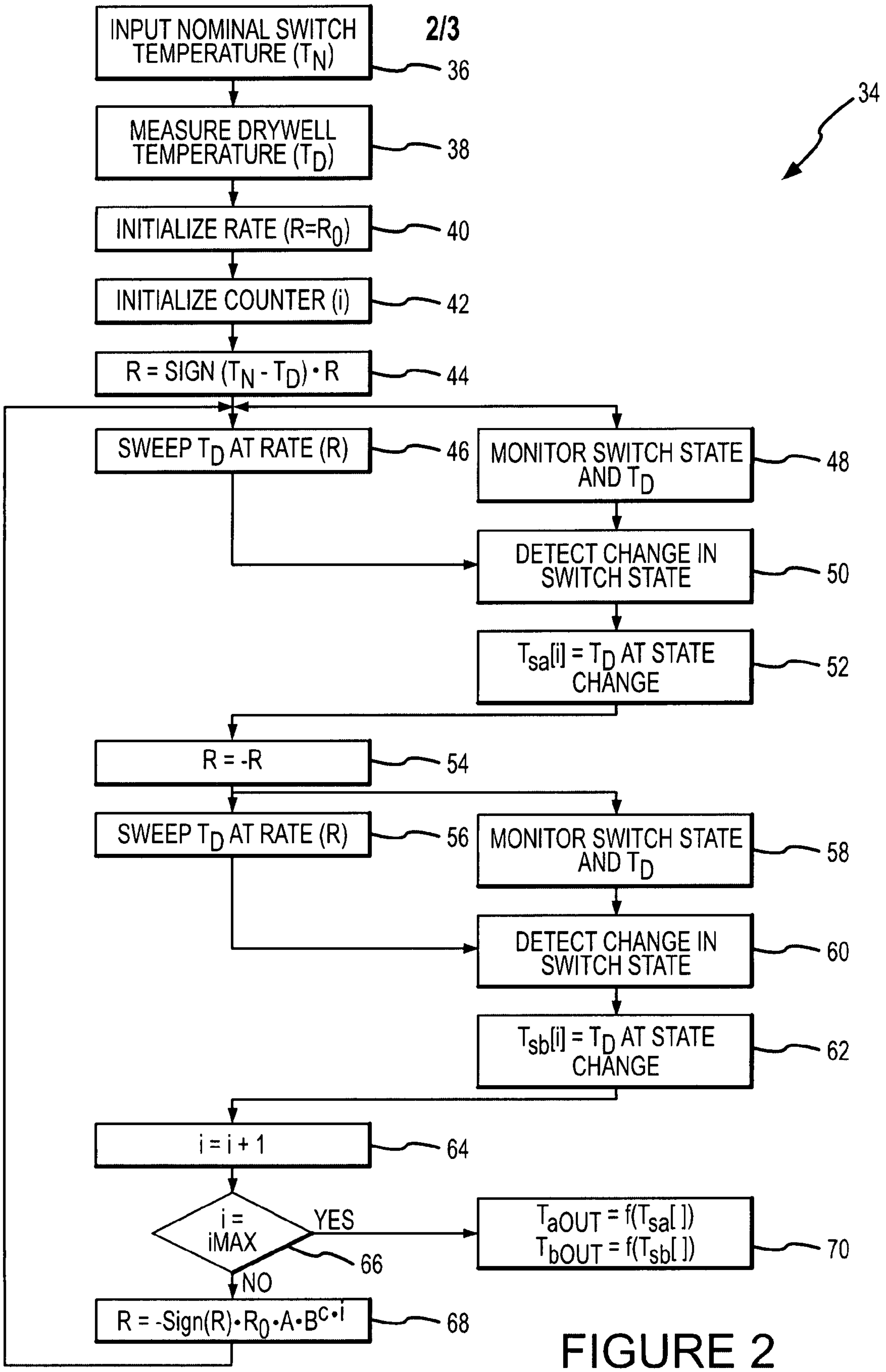
FIG. 2 is a process flow diagram of a method for testing a thermal switch in accordance with an embodiment of the present invention.

Referring to FIG. 2, a method 34 for testing a thermal switch 22 may include inputting a nominal switch temperature ($T_N$) at block 36. At block 38, the temperature ($T_D$) of the drywell 10 is measured. In some embodiments, the drywell temperature is controlled by a feedback loop. In such embodiments, the temperature of the drywell may already be known to be the current temperature setting of the drywell 10 such that block 38 may be eliminated and the current temperature setting used as $T_D$.

At block 40 the rate (R) at which $T_D$ is to be swept is initialized to an initial rate value ($R_0$). In some embodiments, the initial rate $R_0$ is a function of the difference between $T_D$ and $T_N$. In others, the initial rate $R_0$ is fixed. In still others, a default value for $R_0$ is used unless a user specifies an initial value.

In some embodiments a counter (i) may be used to track the number of sweeps across a range of temperatures containing $T_N$. In such embodiments, the method 34 may include initializing the counter to some value, for example 1, at block 42. The sign of R may be set such that $T_D$ will initially sweep in the direction of $T_N$. In the illustrated embodiment, at block 44, $T_D$ is subtracted from $T_N$ and R is multiplied by the sign of the result of this subtraction.

At block 46 the method 34 may then include sweeping $T_D$ at the rate R. As block 46 is executed, the state of the switch 22 and the value of $T_D$ are monitored. At block 50, a change in the state of the switch 22 is detected and at block 52 the value of $T_D$ when the change in state occurred is stored. The value of $T_D$ may be grouped with values of $T_D$ corresponding to changes in the state of the switch 22 during subsequent iterations of the steps of blocks 46, 48, and 50. In some embodiments, the values of $T_D$ corresponding to state changes are grouped according to the direction that $T_D$ was being swept when the change in state occurred. For example, all values of $T_D$ corresponding to state changes that occurred when the $T_D$ was increasing will be grouped together and all values of $T_D$ corresponding to state changes that occurred when $T_D$ was decreasing will be grouped together. In the illustrated embodiment, all values of $T_D$ occurring when sweeping $T_D$ in the initial direction are stored in an array $T_{SA}[i]$ at block 52. After a change in state is detected, the direction that $T_D$ is swept is reversed. In the illustrated embodiment, the sign of the rate R is changed at block 54.

At block 56, $T_D$ is swept in the opposite direction. Again, at block 58, the state of the switch 22 and the value of $T_D$ are monitored as $T_D$ is swept. A change in state is detected at block 60. The value of $T_D$ when the change in state occurred are stored at block 62. In the illustrated embodiment, the value of $T_D$ is stored in an array $T_{SB}[i]$ corresponding to changes in state that occurred as $T_D$ was swept in a direction opposite the initial sweep direction.

In some embodiments, the steps of blocks 46-62 are repeated for multiple iterations. In such embodiments, the counter i may be incremented at block 64. The counter may then be compared to a value (iMAX) to determine if a specified number of iterations has occurred. The number of iterations may be specified by a user or may be set to some default value. In some embodiments, the values in the arrays $T_{SB}[i]$ and $T_{SA}[i]$ are evaluated to determine whether sufficient iterations have occurred. For example, if for a given sweep direction the values at which a change in state occurred for the last two iterations are not within a specified tolerance of one another, the steps of blocks 46-62 may be repeated at a slower rate.

At block 68 the rate R is reduced such that, for the subsequent iteration, $T_D$ will be swept more slowly. In one embodiment of the invention, the rate R is reduced exponentially with each iteration. In the illustrated embodiment, the initial rate $R_0$ is multiplied by a factor B raised to the power of the current value of the counter i. The value of B is preferably less than one such that the value of $B^i$ decreases as i increases. In this manner, the current iteration determines the multiple applied to the initial rate $R_0$. In some embodiments, other constants may be used. For example B may be raised to the power of i multiplied by a constant C. The initial rate $R_0$ may also be multiplied by a constant A. The sign of the rate R may be reversed at block 68 by multiplying the initial rate $R_0$ by the sign of R. After the rate R is scaled at block 68, the steps of 46-62 may then be repeated using the new value of R.

If the number of specified iterations (iMAX) have occurred, or it is otherwise determined that sufficient iterations have occurred, the values at which changes in state occurred are output to a user at block 70. In some embodiments, the value output is the result of a calculation including multiple values at which changes in state occurred. In some embodiments, block 70 includes outputting a weighted average of values at which changes in state occurred for a given sweep direction. In some embodiments, the weights applied to the values are a function of the iteration in which the measurement occurred. For example, the value $T_{SA}[1]$ may be multiplied by f(1) whereas the value $T_{SA}[3]$ is multiplied by a function f(3). f(x) may be an exponential function such that the weight applied to a measured temperature value increases exponentially with the number of the iteration in which it was measured.

Figure 3:
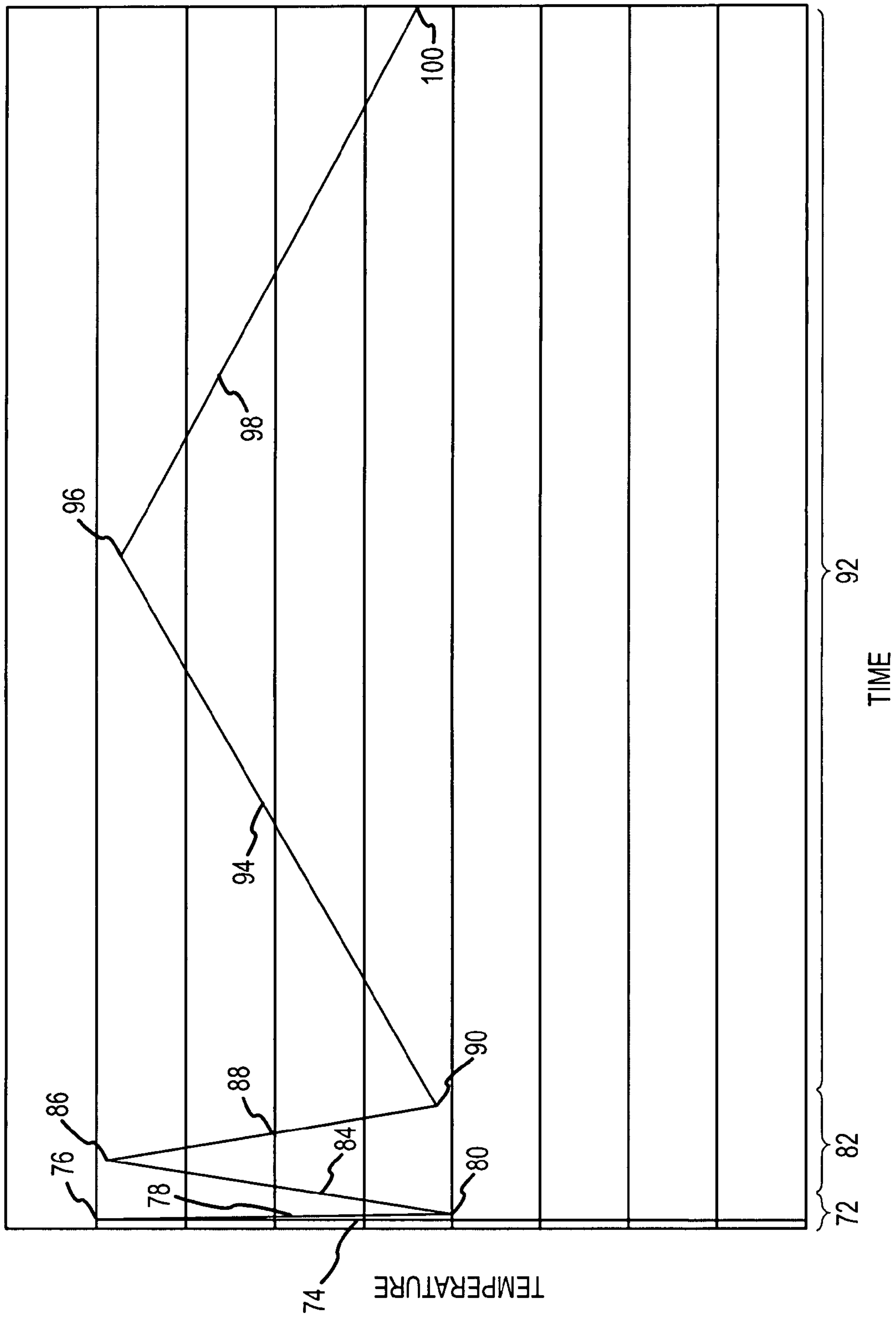
FIG. 3 is a graph representing temperature modulation of a drywell testing a thermal switch in accordance with an embodiment of the present invention.

Referring to FIG. 3, the changes in temperature of the drywell 10 testing a thermal switch according to an embodiment of the invention may approximate the graph shown. In the illustrated embodiment, a first cycle 72 includes increasing the drywell temperature (section 74) until the switch 22 changes state at point 76 and then decreasing the drywell temperature (section 78) until the state changes back at point 80. In the illustrated embodiment, both sections 74 and 78 have about the same rate of temperature change. The points 76 and 80 are typically at different temperatures inasmuch as thermal switches tend to have a hysteresis.

For the second cycle 82, the temperature is increased again (section 84) at a slower rate than the first cycle 72 until the state changes at point 86. The temperature is then decreased (section 88) at the slower rate until the state changes at point 90. For the third cycle 92, the temperature is increased a third time (section 94) at a rate slower than the second cycle 82 until the state changes at point 96. The temperature is then decreased a third time (section 98) at a rate that is slower than the second cycle 82 until the state changes at point 100. In the illustrated embodiment, three cycles are shown. However, in alternative embodiments two cycles or more than three cycles may be performed. For example, four, five, or six cycles may be performed.

The rates for the cycles 72, 82, 92 may be points on an exponentially decreasing curve such that the duration of each cycle increases exponentially for each subsequent cycle. The exponentially decreasing rate may beneficially compensate for delays in the thermal response of the switch such that as the rate decreases the measurement of the switch temperature becomes more accurate. It is important to note that the graph of FIG. 3 may be inverted such that the temperature decrease precedes the temperature increase for the cycles 72, 82, 92. In some embodiments, the temperature increases and decreases at the same rate for each cycle 72, 82, 92. In other embodiments, each time the direction of temperature movement changes, the rate is reduced according to an exponentially decreasing function of the number of direction changes.

The drywell temperatures at which the state of the switch 22 changed during the cycles 72, 82, 92 may be output to a user. In some embodiments, the values are averaged or weighted and averaged. In some embodiments, the temperatures at points 76, 86, 96 may be averaged to determine an upper switch temperature and the temperatures at points 80, 90, and 100 are averaged to determine a lower switch temperature. Weighted averages of the temperatures at points 76, 86, 96 and points 80, 90, and 100 may be calculated and output in some embodiments. For example, inasmuch as the third cycle 92 is the slowest and less prone to time dependent errors, the value 96 may be weighted more heavily. In some embodiments, the weights applied to the temperatures at points 76, 86, and 96 and points 80, 90, and 100 are determined according to an exponentially increasing function with temperatures measured during cycles having a slower rate of temperature change having a larger weight.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A method for testing a thermal switch having a nominal switch temperature and a probe, the method comprising:
- inputting the nominal switch temperature into a controller;
- placing the probe in thermal contact with a heater coupled to the controller;
- modulating a heater temperature at a first rate within a range containing the nominal switch temperature;
- detecting a first change in state in the thermal switch and recording a first measured switch temperature corresponding to the temperature of the heater when the first change in state occurred;
- modulating the heater temperature at a second rate slower than the first rate;
- detecting a second change in state in the thermal switch and recording a second measured switch temperature when the second change in state occurs; and
- outputting a value corresponding to the first and second measured switch temperatures.

2. The method of claim 1, wherein the second rate is an order of magnitude slower than the first rate.

3. The method of claim 1, further comprising:
- modulating the heater temperature at a third rate;
- detecting a third change in state in the thermal switch and recording a third measured switch temperature when the third change in state occurs;
- wherein outputting the value further comprises outputting a value corresponding to the first, second, and third measured switch temperatures;
- and wherein the first, second, and third rate are determined according to an exponentially decreasing function.

4. The method of claim 3, wherein outputting the value comprises weighing each of the first, second, and third measured switch temperatures to obtain weighted first, second, and third measured switch temperatures and wherein the value corresponds to the weighted first, second, and third measured switch temperatures.

5. The method of claim 4, wherein the first, second, and third measured switch temperatures are weighted proportionally to an inverse of the first, second, and third rates, respectively.

6. The method of claim 1, wherein the heater is a drywell.

7. A method for testing a thermal switch having a nominal switch temperature and a probe, the method comprising:
- inputting the nominal switch temperature into a controller;
- placing the probe in thermal contact with a heater coupled to the controller;
- measuring a heater temperature;
- moving the heater temperature in a first direction toward the nominal switch temperature at a first rate;
- detecting a first change in state in the thermal switch and recording a first measured switch temperature corresponding to the heater temperature where the first change in state occurred;
- moving the heater temperature in a second direction opposite the first direction at the first rate;
- detecting a second change in state in the thermal switch and recording a second measured switch temperature corresponding to the heater temperature where the second change in state occurred;
- moving the heater temperature in the first direction at a second rate lower than the first rate;
- detecting a third change in state in the thermal switch and recording a third measured switch temperature corresponding to the heater temperature where the third change in state occurred;
- moving the heater temperature in the second direction at the second rate; and
- detecting a fourth change in state in the thermal switch and recording a fourth measured switch temperature corresponding to the heater temperature where the fourth change in state occurred;
- outputting a first value corresponding to the first and third measured switch temperatures and a second value corresponding to the second and fourth measured switch temperatures.

8. The method of claim 7, wherein the second rate is an order of magnitude lower than the first rate.

9. The method of claim 7, wherein the first value corresponds to a weighted average of the first and third measured switch temperatures and wherein the second value corresponds to a weighted average of the second and fourth measured switch temperatures.

10. The method of claim 7, further comprising:
- moving the heater temperature in the first direction at a third rate lower than the second rate;
- detecting a fifth change in state in the thermal switch and recording a fifth measured switch temperature corresponding to the heater temperature where the fifth change in state occurred;
- moving the heater temperature in the second direction at the third rate; and
- detecting a sixth change in state in the thermal switch and recording a sixth measured switch temperature corresponding to the heater temperature where the sixth change in state occurred;
- outputting a first value corresponding to one or more of the first, third, and fifth measured switch temperatures; and
- outputting a second value corresponding to one or more of the second, fourth, and sixth measured switch temperatures.

11. The method of claim 10, wherein outputting the first value comprises outputting a weighted average of two or more of the first, third, and fifth measured switch temperatures and wherein outputting the second value comprises outputting a weighted average of two or more of the second, fourth, and sixth measured switch temperatures.

12. The method of claim 11, wherein outputting a weighted average of two or more of the first, third, and fifth measured switch temperatures comprises weighing two or more of the first, second, and third measured switch temperatures according to a function exponentially increasing with a sequence position of the first, second, and third measured switch temperatures.

13. The method of claim 12, wherein outputting a weighted average of two or more of the second, fourth, and sixth measured switch temperatures comprises weighing two or more of the second, fourth, and sixth measured switch temperatures according to a function exponentially increasing with a sequence position of the second, fourth, and sixth measured switch temperatures.

14. The method of claim 7, wherein the heater is a drywell.

15. A drywell comprising:

a receiver adapted to receive a portion of a thermal switch having a nominal switch temperature;

a heating element in thermal contact with the receiver;

a temperature sensor in thermal contact with the receiver;

a controller electrically coupled to the heating element and temperature sensor and adapted to electrically couple to the thermal switch, the controller programmed to modulate a heater temperature of the heater within a range containing the nominal switch temperature, detect a first change in state in the thermal switch and record a first measured switch temperature corresponding to the heater temperature when the first change in state occurred, modulate the heater temperature at a second rate slower than the first rate, detect a second change in state in the thermal switch and recording a second measured switch temperature when the second change in state occurs, and output a value corresponding to the first and second measured switch temperatures.

16. The drywell of claim 15, wherein the second rate is an order of magnitude slower than the first rate.

17. The drywell of claim 15, wherein the controller is further programmed to modulate the heater temperature at a third rate, detect a third change in state in the thermal switch, record a third measured switch temperature when the third change in state occurs; wherein the value output by the controller corresponds to the first, second, and third measured switch temperatures; and wherein the controller is programmed to determine the first, second, and third rate according to an exponentially decreasing function.

18. The drywell of claim 17, wherein the controller is programmed to compute a weighted average of the first, second, and third measured switch temperatures.

19. The drywell of claim 18, wherein the controller is programmed to weight the first, second, and third measured switch temperatures according to a function increasing exponentially with a sequence position of each of the first, second, and third measured switch temperatures.

* * * * *